April 6, 1965     H. MEYER     3,176,403
MEASURING ELEMENTS, PARTICULARLY FOR CONSIDERABLE LENGTHS
Filed May 18, 1961

INVENTOR
Hans Meyer

BY
           ATTORNEY

United States Patent Office 3,176,403
Patented Apr. 6, 1965

3,176,403
MEASURING ELEMENTS, PARTICULARLY FOR CONSIDERABLE LENGTHS
Hans Meyer, Le Bugnon 24, Renens, Vaud, Switzerland
Filed May 18, 1961, Ser. No. 110,919
Claims priority, application Switzerland, June 30, 1960, 7,472/60
3 Claims. (Cl. 33—168)

It is generally known that in measuring elements, particularly those of considerable length, sag or bend under their own weight between their end or supports upon which they are mounted.

As it is rarely possible for practical reasons to support the measuring elements throughout their entire length, endeavours have been made to suspend or support them at suitable points, so that the sagging is kept at a minimum, without, however, entirely removing all of the sag. As further means eliminate bending pretensioned systems of concentric pipes have been suggested, with, however, only a partial correction of the undesirable deflection.

The invention has for its object to counteract the sagging, particularly of elements for measuring element, by the counter-action of a compensating and sustaining liquid. It is possible in this manner to completely remove the dangerous bending, produced by the action of gravity in a simple manner.

The accompanying drawing shows an example of construction of the subject of the invention.

Figure 1:
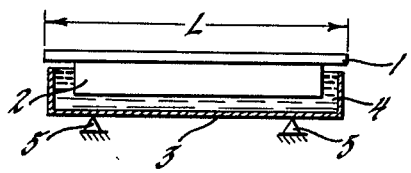
FIG. 1 is a diagrammatic sectional view illustrating the principle of the invention.

In FIG. 1 is illustrated an end mass 1 of definite length L, which is secured to or rests on a body 2. The body 2, preferably made hollow, floats in the liquid 4, which is located in the tank 3 mounted on supports 5.

By shaping the body 2 and the end mass 1, it is possible to insure that the axis of the end mass, when of suitable length, forms a straight line. In this case the distance L corresponds with the actual length of the end mass, which would not be the case with an end mass suspended throughout. For practical reasons, the arrangement according to FIG. 1 would be restricted to a particular case of use. A greater range of application, however, is included, in the preferred arrangement illustrated in FIGS. 2 and 3. Here a tubular measuring element 8 is mounted in a cylindrical supporting tube 6 which is at least partly filled with fluid. Packing rings 7 of elastic material space the measuring element 8 and the supporting tube 6 and simultaneously prevent the outflow of the liquid.

Quantity and specific weight of the liquid, as also material and dimensions of the measuring element, are so selected that the liquid just supports the weight of the measuring element.

Figure 2:
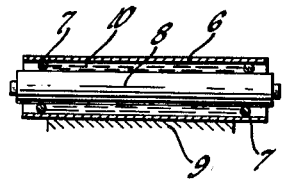
FIGS. 2 and 3 are diagrammatic sectional views of structural arrangements further illustrating the invention.

In FIG. 2 the supporting tube 6 is placed flat on an even support 9. As the weight of the measuring element 8 is compensated by the upward thrust of the surrounding fluid, its axis is not subjected to any bending and remains straight.

Figure 3:
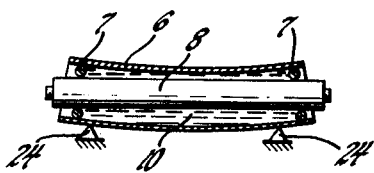

In FIG. 3, however, the tube 6 is mounted on supports and bends under the influence of its own weight and the weights of the liquid and of the measuring element 8 in the manner illustrated. The measuring element 8, however, is not affected by the bending, as also in this case its own weight is removed by the flotation effect of the liquid 10 and the elastic packings 7 permit of a practically unhindered adjustment.

It may even occur that the liquid drive may exceed the weight of the measuring element, so that a slight upward bending is obtained, which may be of use in particular cases.

Figure 4:
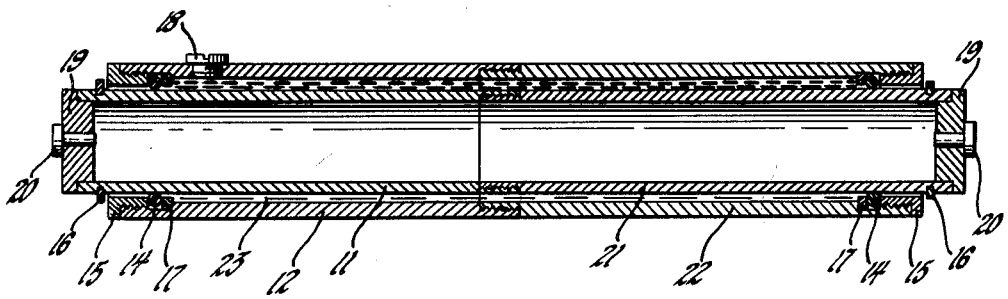
FIG. 4 is a longitudinal sectional view of one embodiment of the invention.

In FIG. 4 is illustrated, in longitudinal section, a form of construction according to the principle illustrated in FIG. 2. The measuring element is here formed by two tubes 11 and 21 screwed one into the other, whose ends are closed by pressed in covers 19 which receive the measuring impuses 20. The external casing in the form of supporting tube, consisting of the tube parts 12 and 22, surrounds the measuring element and is supported thereon by the packing rings 14 of elastic material. Gland nuts 15 screwed into the tubes 12 and 22 press the packing rings 14 tightly against the discs 17, so that, on the one hand, the liquid 23 is prevented from passing out of the intermediate space between the measuring element and the supporting tube, in other words the engagement of the measuring element in the supporting tube is not hindered.

Securing rings 16, fitted into the tubes 11 and 21 limit the supporting tube in its length relatively to the measuring element.

Through an opening in the tubes 12, closed by the screws 18, a liquid 23, for example oil, can be supplied into the intermediate space between the supporting tube and the measuring element. By determining the material and the dimension of the measuring element (tubes 11 and 21) relatively to the specific weight of the liquid 23, it is possible to insure that the compensating and sustaining effects of the liquid corresponds with the weight of the measuring element and thus any sagging thereof is eliminated.

The size of the intermediate space between the measuring element and the supporting tube is preferably so measured that the two parts cannot touch one another in any case with a suitable suspension of the supporting tube.

It will be seen that the actual weight of the measuring element in the examples shown in FIGS. 2 to 4, is then also removed by the supporting effect of the liquid, when the supporting tube is located in a position other than horizontal.

In the above examples, the measuring element is constructed as a stretched body. The principle of the invention may naturally also be applied to bodies which have a particular shape, for example the shape of a loop and in which the influence of gravity is to be removed.

Further, the invention is not restricted to the territory of mechanical measurement, but may, for example, also extend to the field of applied optics. Thus, for example, in the case of large telescopes it may permit of a tensionless and freely suspended mounting of a tube in a supporting tube.

I claim:

1. A measuring device for accurately determining the distance between two relatively widely spaced points, comprising:
   a tubular external casing,
   a tubular measuring element within and spaced from the casing to provide a chamber,
   sealing means at the ends of the casing and chamber,
   a sustaining fluid in said chamber and surrounding said measuring element to obviate bending of the external casing being transmitted to the measuring element to prevent the latter from sagging,
   and covers fitted to the opposite exposed ends of the measuring elements.

2. A measuring device according to claim 1, wherein, the external casing has an opening communicating with said chamber and a removable and replaceable filler plug for sealing said opening.

3. A measuring device according to claim 1, wherein, the casing and measuring element are each made of separate sections detachably connected at their inner ends.

References Cited by the Examiner

UNITED STATES PATENTS

| | | | |
|---|---|---|---|
| 803,770 | 11/05 | Low | 33—209 |
| 2,847,764 | 8/58 | Schaerer | 33—168 |

ISAAC LISANN, *Primary Examiner.*